United States Patent [19]
Olnowich et al.

[11] Patent Number: 5,404,537
[45] Date of Patent: Apr. 4, 1995

[54] PRIORITY INTERRUPT SWITCHING APPARATUS FOR REAL TIME SYSTEMS

[75] Inventors: Howard T. Olnowich, Endwell, N.Y.; David B. Kirk, Monroeville, Pa.

[73] Assignee: International Business Machines Corp., Armonk, N.Y.

[21] Appl. No.: 946,986

[22] Filed: Sep. 17, 1992

[51] Int. Cl.⁶ .................. G06F 9/46; G06F 15/16
[52] U.S. Cl. ........................ 395/725; 395/800; 370/60.1; 340/825.51; 364/284; 364/284.4; 364/284.3; 364/241.9; 364/242.94; 364/242.96; 364/DIG. 1; 364/241.2
[58] Field of Search .......... 395/725, 325, 200, 800, 395/275; 370/60.1; 340/825.5, 825.51

[56] References Cited

U.S. PATENT DOCUMENTS

| | | | |
|---|---|---|---|
| 4,536,877 | 8/1985 | Livingston et al. | 370/85.9 |
| 4,602,327 | 7/1986 | LaViolette et al. | 395/325 |
| 4,680,757 | 7/1987 | Murakami et al. | 370/85.4 |
| 4,706,240 | 11/1987 | Payne, III | 370/60 |
| 4,965,788 | 10/1990 | Newman | 370/60 |
| 5,016,163 | 5/1991 | Jesshope et al. | 395/325 |
| 5,020,020 | 5/1991 | Pomfret et al. | 395/200 |
| 5,125,096 | 6/1992 | Brantley et al. | 395/800 |
| 5,241,533 | 8/1993 | Kimoto et al. | 370/13.1 |
| 5,276,899 | 1/1994 | Neches | 395/800 |
| 5,282,272 | 1/1994 | Guy et al. | 395/275 |

OTHER PUBLICATIONS

IBM TDB vol. 33, No. 5, Oct., 1990, "Asynchronous Digital Video Switching System", by Farrell et al, pp. 227–233.

*Primary Examiner*—Gopal C. Ray
*Attorney, Agent, or Firm*—Eugene I. Shkurko; Lynn L. Augspurger

[57] ABSTRACT

A method and apparatus for implementing intelligent priority functions at individual switching apparatus devices which comprise switching networks. The intelligent switching functions are capable of operating in real time systems with high efficiency. The switching apparatus has the capability at each stage of the network to make and/or break connections on a priority basis. If a connection is requested at a switch stage and the connection is being used by a lower priority device, the low priority connection is interrupted (broken) and the requested higher priority connection is established. After the high priority connection has completed its usage of the connection, the high priority connection is broken and the lower priority connection is re-established.

14 Claims, 9 Drawing Sheets

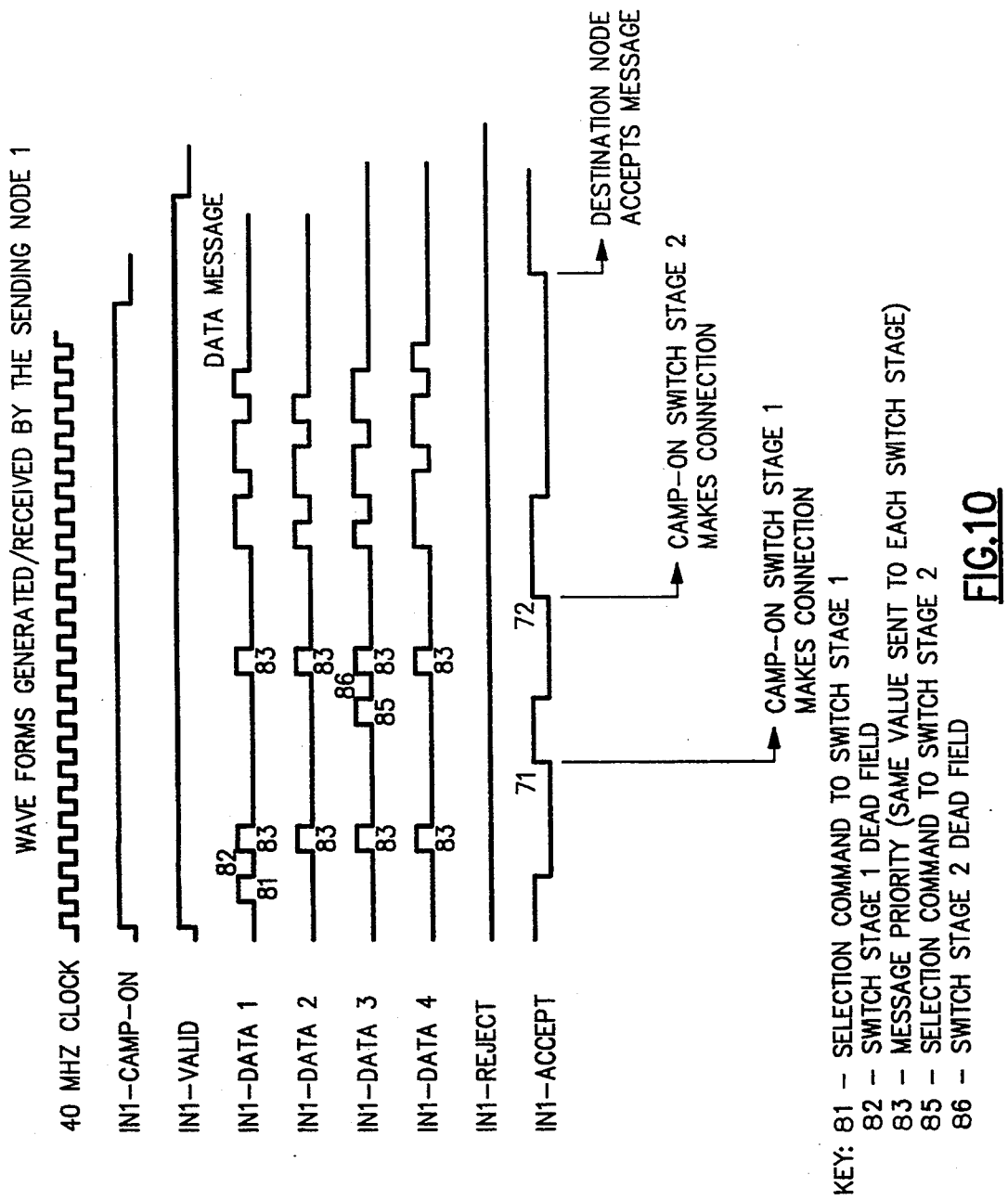

PRIORITY INTERRUPT SWITCHING APPARATUS FOR REAL TIME SYSTEMS

RELATED APPLICATIONS

The present U.S. patent application claims priority and is related to the following applications:

U.S. Ser. No. 07/677,543, filed Mar. 29, 1991, entitled "All-Node Switch, An Unclocked, Unbuffered Asychronous Switching Apparatus", by P. A. Franasck et al., and U.S. Ser. No. 07/799,497, Filed Nov. 27, 1991, entitled "Multi-Function Network" by H. T. Olnowich. et al., and U.S. Ser. No. 07/799,498, Filed Nov. 27, 1991, entitled "Dual Priority Switching Apparatus for Simplex Networks" described by H. T. Olnowich et al., and U.S. Ser. No. 07/799,602, Filed Nov. 27, 1991, entitled "Multi-Media Serial Line Switching Adapter for Parallel Networks and Heterogenous and Homologous Computer Systems", by H. T. Olnowich, et al.

The present application is also related to the following applications filed concurrently herewith:

U.S. Ser. No. 07/946,196, filed Sep. 17, 1992, entitled "Multi-Media Analog/Digital/Optical Switching Apparatus", by H. T. Olnowich et al, and, U.S. Ser. No. 07/946,204, filed Sep. 17, 1992, entitled "Switch-Based MicroChannel Planar Apparatus" by H. T. Olnowich et al, and, U.S. Ser. No. 07/946,512, filed Sep. 17, 1992, entitled "Switch-Based Personal Computer Interconnection Apparatus" by H. T. Olnowich et al, and, U.S. Ser. No. 07/947,644, filed Sep. 17, 1992, entitled "Slave MicroChannel Apparatus for Converting to Switch Architecture" by H. T. Olnowich et al, and, U.S. Ser. No. 07/946,506, filed Sep. 17, 1992, entitled "Master MicroChannel Apparatus for Converting to Switch Architecture" by H. T. Olnowich et al, and, U.S. Ser. No. 07/946,513, filed Sep. 17, 1992, entitled "Variable Cyclic Redundancy Coding Method and Apparatus" by H. T. Olnowich et al, and, U.S. Ser. No. 07/947,010, filed Sep. 17, 1992, entitled "Signal Regeneration Apparatus for Multi-Stage Transmissions", by H. T. Olnowich et al, and, U.S. Ser. No. 07/947,023, filed Sep. 17, 1992, entitled "Adaptive Switching Apparatus for Multi-Stage Networks", by H. T. Olnowich et al, and, U.S. Ser. No. 07/946,514, filed Sep. 17, 1992, entitled "Increasing Probability Multi-Stage Network", by H. T. Olnowich et al, and, U.S. Ser. No. 07/946,509, filed Sep. 17, 1992, entitled "Message Header Generation Apparatus for Parallel Systems" inventors H. T. Olnowich et al.

These applications and the present application are owned by one and the same assignee, International Business Machines Corporation of Armonk, New York.

The descriptions set forth in the previous applications and the concurrently filed applications are incorporated by reference. These applications and the present application are owned by one and the same assignee, namely, International Business Machines Corporation of Armonk, New York.

FIELD OF THE INVENTIONS

The present invention relates to real time digital computer systems comprised of several or many computing and/or input/output elements, and the ability of the said individual elements to perform high speed, low-latency communications with each other in a parallel fashion over a multi-stage, switching interconnection network.

The present invention further relates to multi-stage, circuit-switched networks without central clocking, and the ability to transfer digital data over the network quickly and accurately between parallel elements, such that high priority elements interrupt lower priority elements.

GLOSSARY OF TERMS

Adaptive

The ability of each switching element to determine for itself which of several optional alternate paths to try at each stage of the network based on availability.

Alternate Path

One of a plurality of connection paths that can be used to form a connection between a sending node and a receiving node through a multi-stage network.

Blocking

The characteristics of multi-stage networks which sometimes prevent a sending node from establishing a connection to an available receiving node due to the properties of the network.

Busy

A connection state where the port designated to be connected to a connection path is used by a previous connection path.

Camp-on

The ability of connection path to wait until a blocked or busy connection becomes available.

Circuit-switched network

A network where the individual switching elements comprising the network do not buffer the data messages, but pass them immediately as a direct connection from input to output.

Connection Path

A route through a multi-stage network used to connect a sending node to a receiving node.

Data Message

A format for sending information between nodes of a parallel system incorporating the further ability to check the said information for accuracy using cyclic redundancy coding methods.

Data

Another term for Data Message

Idle

The state of a switch interface where it is not presently involved in the process of connecting two nodes.

Interrupt

The capability of a higher priority data transmission through a network to halt and delay a lower priority data transmission until after the higher priority transmission is complete.

Message

Another term for Data Message

Node

A functional element of the system comprised of one or more processors or input/output devices interconnected by a network.

Nodal element

Another term for node, which has the same meaning.

NRZ

Abbreviation for non-return to zero.

Port

A single bi-directional entry and exit point to a switching network.

Receiving Node

A functional element which is receiving data transmitted over a network.

Sending Node

A functional element which is transmitting data over a network.

BACKGROUND OF THE INVENTIONS

Parallel computing systems consist of a plurality of processors that communicate via an interconnection network. One popular network for providing the interconnection for a plurality of processors is the circuit-switched network comprised of multiple circuit switches. The state-of-the-art unbuffered circuit switch is the ALLNODE Switch (Asynchronous, Low Latency, inter-NODE switch), which is disclosed in U.S. Ser. No. 07/677,543. The Allnode switch as disclosed in U.S. Ser. No. 07/677,543 provides excellent low latency characteristics because it implements a minimum amount of circuitry at each switch stage of a multi-stage interconnection network. The latency across the switch is extremely fast because the equivalent of a straight wire connection is provided across each switch stage. The Allnode Switch supports a totally asynchronous transmission that does not require relatching or buffering at the individual switch elements. Therefore, the Allnode Switch delivers data messages being transmitted through the switch as quickly as possible avoiding the delays of any buffering.

As the field of parallel processing advances, the need for better preforming interconnection networks comprised of multiple stages becomes of prime impotrance. In addition, the need for more complex network functions arises. One function which is noticeably missing from modern networks is the capability of higher priority transmissions to cancel, interrupt, or break-through lower priority blockages in the network. Instead, present networks give priority to an established connection and make it impossible for a transmission of higher priority to cancel, interrupt, or break-through a previously established connection in the network of lower priority. The problem this leads to is that low priority messages can block higher priority messages. This creates problems, especially in Real Time Systems where it is necessary for higher priority messages to always be delivered immediately without being blocked or delayed by lower priority messages.

To date, one of the highest performing circuit switch networks has been described in U.S. Ser. No. 07/799,497, Filed Nov. 27, 1991, entitled "Multi-Function Network" by H. T. Olnowich et al. The said network uses multiple paths through the network, called alternate paths, and searches for an open path to make a network connection. The said network uses the "Dual Priority Switching Apparatus for Simplex Networks" described by H. T. Olnowich et al. in U.S. Ser. No. 07/799,262, which is a two mode switch capable of performing two different switching modes based on the presence of different types of traffic patterns in the network. The first mode causes connections in the network to be broken if "cold" or random traffic encounters blockage in the network, and then path establishment is retried over a different alternate path in the network as controlled by the node trying to establish the connection. The second mode causes traffic into the network which has been classified as "hot" traffic to experience a different network capability of camp-on (previously won connections in the network are not broken when hot spot congestion is experienced in the network). In the camp-on mode, the request for a connection is placed into a priority queue at the switch experiencing blockage and serviced as soon as the blockage dissapates on a fairness basis to prevent the starvation of any node encountering a hot spot.

Often systems require multiple paths through the switching networks to perform different functions. An earlier work at IBM by Peter Franaszek, as described in his work entitled "Multipath Hierarchies in Interconnection Networks" described two hierarchical paths for a network, one providing low-latency message transfer and the other providing guaranteed-delivery of a message transfer and the other providing guaranteed-delivery of a message at a longer latency. A message is attempted over the low-latency path first. If the transmission fails due to blocking or contention, it is retransmitted over the guaranteed-delivery path. This allows usually about 90% of the messages to be sent successfully over the low-latency path, and guarantees the delivery of a message that gets blocked on the low-latency path due to retransmissions.

U.S. Pat. No. 4,952,930 to P. A. Franaszek et al. issued Aug. 28, 1990 described the approach which used a second buffered path, which is in some ways similar to the current approach. However, it suffered by its requirements of a plurality of switches to implement it. While there would be no impediment to our adopting the teachings of this patent there remained a need for a simpler and yet more flexible approach to create a multi-stage network.

Multi-stage networks have become an accepted means for interconnecting multiple devices within a computer system. They are a replacement for the traditional crossbar interconnection. The crossbar is still a most efficient method of network interconnection, but it tends to be impractical for large systems. An N×M crossbar permits total simultaneous interconnection, where all the N devices can be communicating simultaneously with different members of the set of M devices. The crossbar is "non-blocking" because their is nothing internal to the crossbar which prevents any given N device from connecting to an M device which is IDLE (is not connected to some other N device). If an N device desires to connect to an M device which is BUSY (previously connected to some other N device), no connection can be made until the previous connection is broken—however, this is referred to as "contention" and is not called "blocking".

When N and M become large (usually greater than 32 or 64) it becomes very unwieldy to build crossbars since there complexity increases at an N×M rate and their pin count increases at an (N×M)×W rate, where W=the number of pins per port. Thus large networks are usually built from multi-stage networks constructed by cascading several stages of smaller crossbars together to provide an expanded network. The disadvantage of multi-stage networks is that they are "blocking", i.e., a connection might not be able to be made to an IDLE M device because there is no path available in the network to provide the necessary connection to the IDLE device.

Among other patents which might be reviewed are: U.S. Pat. No. 4,914,571 to A. E. Baratz et al. issued Apr. 3, 1990 which describes a method of addressing and thus how to find resources attached to a network, but does not deal with the hardware for the actual network itself.

U.S. Pat. No. 4,455,605 to R. L. Cormier et al. issued Jun. 19, 1984 which is for a bus oriented system, it is not a multi-stage network. Similarly, U.S. Pat. No. 4,396,984 to E. R. Videki, II issued Aug. 2, 1983 is for an I/O bus channel, not a multi-stage network. U.S. Pat. No. 4,570,261 to J. W. Maher issued Feb. 11, 1986 is for fault recovery over a bus oriented system, not a multi-stage network.

U.S. Pat. No. 4,207,609 to F. A. Luiz et al. issued Jun. 10, 1980 illustrates an I/O bus channel so that those in the art will understand the differences between the subject matter. It is not a multi-stage network.

U.S. Pat. No. 4,873,517 to A. E. Baratz et al. issued Oct. 10, 1989 is for a totally different type of network, not an equi-distant multi-stage network like that which we will describe, and also, U.S. Pat. No. 4,932,021 to T. S. Moody issued Jun. 5, 1990 for bus wiring paths inside a computer box, it is not a multi-stage network. U.S. Pat. No. 4,733,391 to R. J. Godbold et al. issued Mar. 22, 1988 illustrates a ring interconnection network, which is unlike a multi-stage network. U.S. Pat. No. 4,811,201 to B. R. Rau et al. issued Mar. 7, 1989 are not applicable to a multi-stage network. U.S. Pat. No. 4,754,395 to B. P Weisshaar et al. issued Jun. 28, 1988 is for a ring interconnection network.

The present invention is a modification of the Allnode switch concept as disclosed the parent application, U.S. Ser. No. 07/677,543. We have solved some of the real time problems encountered in the prior art and will describe a way whereby some of the traditional blocking problems in multi-stage networks are circumvented on a priority interruption basis.

SUMMARY OF THE INVENTION

The invention is a method and apparatus for implementing intelligent priority functions at individual switching apparatus devices which comprise switching networks. The intelligent switching functions are capable of operating in Real Time Systems with high efficiency. The switching apparatus disclosed has the capability at each stage of the network to make and/or break connections on a priority basis. If a connection is requested at a switch stage and the connection is being used by a lower priority device, the low priority connection is interrupted (broken) and the requested higher priority connection is established. After the high priority connection has completed its usage of the connection, the high priority connection is broken and the lower priority connection is re-established.

The present invention also provides methods for improving the performance of lower priority data transfers through the multi-stage network. If a connection is requested at a switch stage and the connection is being used or requested by a higher priority device, the requested connection is not established for the lower priority. Instead, the camp-on function is invoked which keeps the unsuccessful connection pending until the higher priority user relinquishes the facility. Then immediately, another pending connection (the highest priority pending connection) is made at the earliest moment that the next connection could possibly be established.

The invention method is particularly effective in asynchronous circuit-switched networks, where interrupt and camp-on controls can be passed through multiple switch satges instantaneously, without being encumbered by buffers in the switch connection paths. An important feature of the invention is the ability of each switching element to determine for itself which connections to establish and which connections to camp-on. This places the decision making capability directly at the switching apparatus involved, which has the data required to make an intelligent decision.

Further adaptibilty of the invention method is provided by giving the the sending nodes the full flexibility to define and change the priority it is using with every individual data message that it transmits through the network.

The invention is a modification of the high speed and low latency switch interconnection techniques disclosed in the parent application, entitled "Allnode Switch." An unclocked, unbuffered, asychronous, switching apparatus. The parent Allnode Switching apparatus provides a switching network communication structure that has the characteristic of simplicity of implementation, and does not require data buffering or data conversion of any kind. It establishes or breaks connections instantaneously and is, therefore, dynamically changeable with a very quick response time. It has the capability of resolving requests to establish connections in a parallel manner, where n connections can be established or broken at the same time (where n=the number of elements of the system which are communicating via the switching network). Thus, the number of connections that can be made or broken simultaneously scales directly with the size of the system. This capability enables the invention apparatus to handle multiple shod messages very efficiently. In addition, the new apparatus is devoid of synchronization requirements or wire length restrictions. It also has the ability to track the speed improvements of new technologies and to increase performance as the technology used to implement the invention apparatus improves.

BRIEF DESCRIPTION OF THE DRAWINGS

FIG. 10 shows a detailed timing diagram of the priority sequences involved in establishing a connection path at the invention switching apparatus.

DETAILED DESCRIPTION OF THE PREFERRED METHOD and EMBODIMENT

Figure 1:
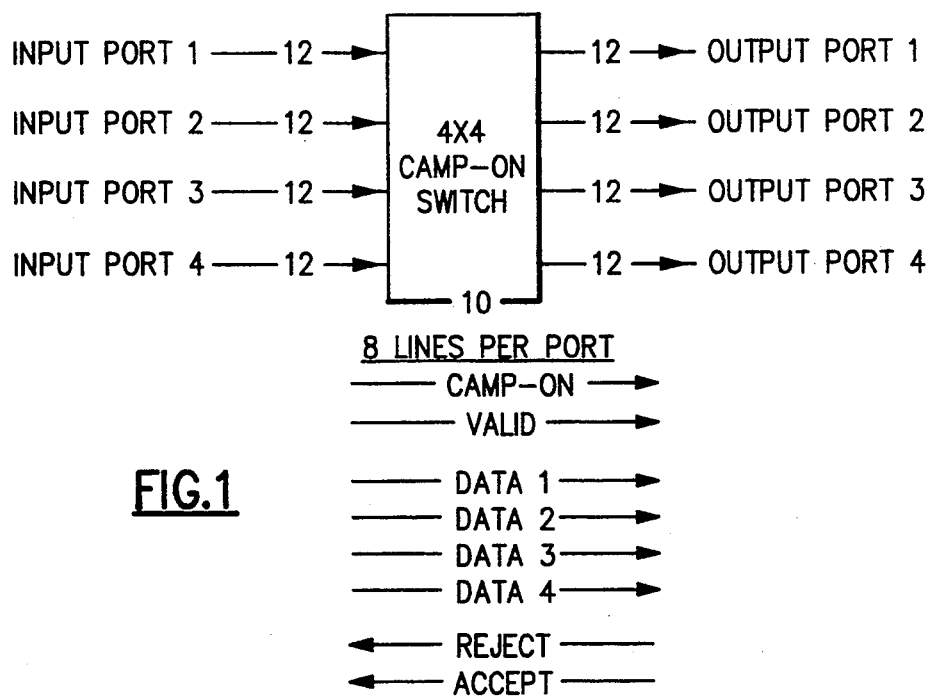
FIG. 1 illustrates generally our preferred embodiment of the modified asynchronous switching apparatus and the interface required to enable the priority interrupt and camp-on features to be implemented.

The invention is a modification of the high speed and low latency switch interconnection techniques disclosed in the parent application, entitled "Allnode Switch—An Unclocked, Unbuffered, Asynchronous, Switching Apparatus". FIG. 1 illustrates generally our preferred embodiment of modifying the asynchronous Allnode switching apparatus $10m$ by adding one signal line in the interface to each input and output port of the parent Allnode switch. FIG. 1 shows the added signal to be the CAMP-ON signal at each of the input ports and output ports of switching apparatus $10m$. Each additional signal contain camp-on and priority control information that accompanies the data and other 3 control signals at each port that are normally provided to the Allnode Switch. This has a minimum impact of adding one extra input/output connection to the switch chip for every switch input and output port, assuming the switching apparatus is packaged using standard single chip technology.

Figure 2:
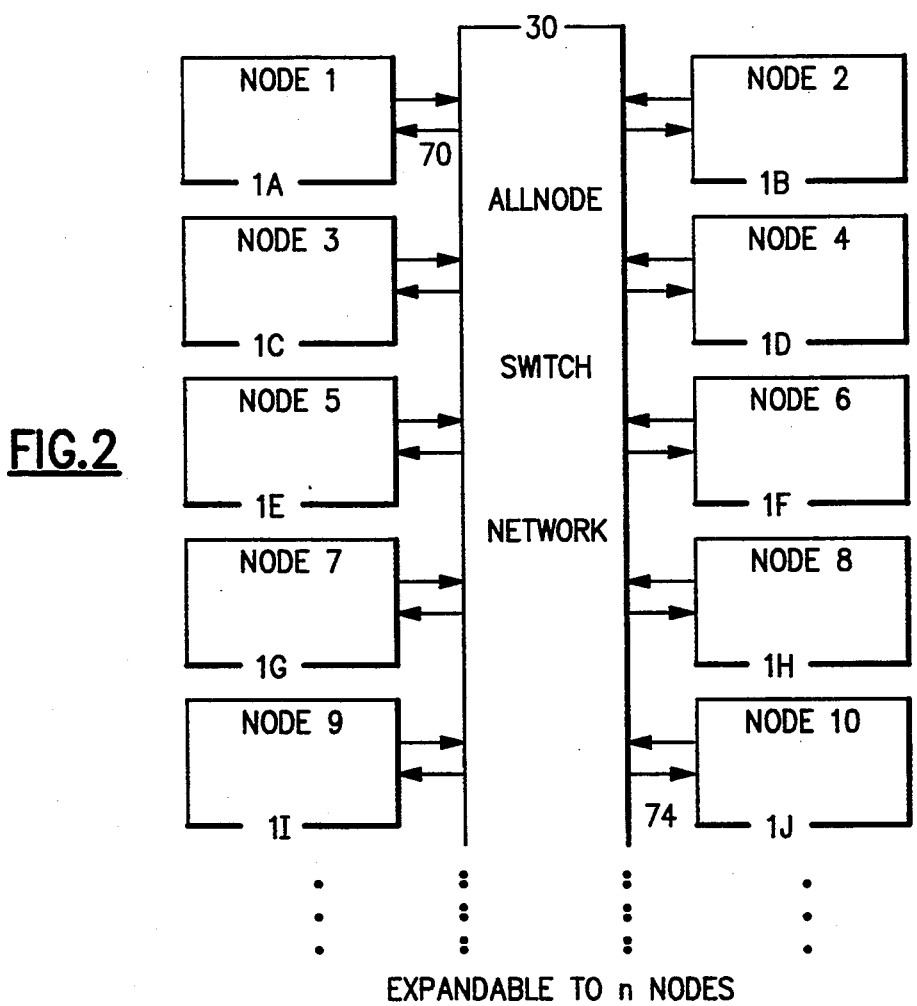
FIG. 2 illustrates generally the method used to interconnect multiple nodes of a parallel real time system using a switching network.

Referring to FIG. 2, the preferred embodiment for interconnecting n parallel nodes of a real time system via a multi-stage, interconnection network 30 using switching elements is shown. The preferred switching elements of network 30 is the basic asynchronous and unbuffered Allnode switching concept disclosed in the parent application U.S. Ser. No. 07/677,543 and modified by the present invention to incorporate camp-on and priority interrupt qualities. The Allnode Switching apparatus provides a switching network communication structure that has the characteristic of simplicity of implementation, and does not require data buffering or data conversion of any kind. It establishes or breaks connections instantaneously and is, therefore, dynamically changeable with a very quick response time. It has the capability of resolving requests to establish connections in a parallel manner, where n connections can be established or broken at the same time (where n=the number of elements of the system which are communicating via the switching network). Thus, the number of connections that can be made or broken simultaneously scales directly with the size of the system. This capability enables the invention apparatus to handle multiple shod messages very efficiently. In addition, the new apparatus is devoid of synchronization requirements or wire length restrictions. It also has the ability to track the speed improvements of new technologies and to increase performance as the technology used to implement the invention apparatus improves. In addition, the Allnode switching apparatus can be cascaded with other identical apparatus devices to form interconnection networks among any number of system elements or nodes. Said network 30 would have the characteristics for full parallel interconnection.

The preferred embodiment uses only unidirectional interfaces, and therefore FIG. 2 shows the switch interface 70 to be comprised of two unidirectional sets of lines, one carrying data to the switch network from node 1A, and one carrying data from the switch network to node 1A.

It is here understood that the FIGS. 3 to 9 are illustrations which are common to U.S. Ser. No. 07/677,543, the parent application which is incorporated herein by reference as to all of its contents. FIGS. 3 to 9 refer to a 4×4 crossbar implementation of the ALLNODE Switch to illustrate the principles and speed of the switching concept.

Figure 3:
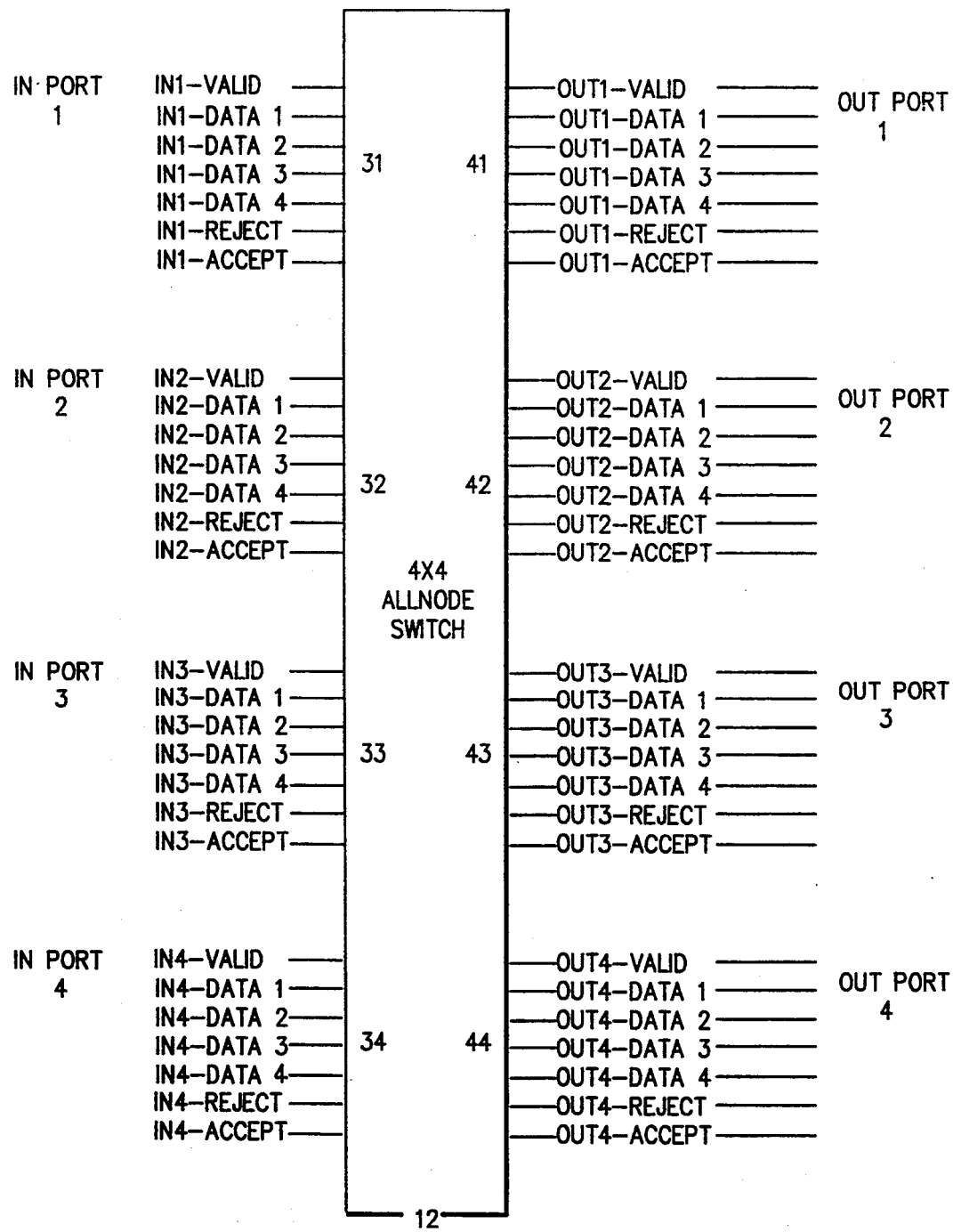
FIG. 3 illustrates the parent four input and four output (4×4) crossbar switching apparatus, which operates asynchronously and has the capability of being modified to provide the disclosed improvements.

Referring to FIG. 3, the preferred embodiment is a 4×4 switching apparatus 12, where the function of the present invention is to provide a means of connecting any of 4 sets of digital, analog, or optical inputs on a mutually exclusive basis to any one of the unused 4 output ports. The 4×4 switching apparatus 12 can support up to 4 simultaneous connections at any given time. For instance, Input 1 could be connected to Output 3, Input 2 to Output 4, Input 3 to Output 2, and Input 4 to Output 1.

The invention switching apparatus 12 is unidirectional, which means that data flows in only one direction across the said switching apparatus 12, that being from input to output. Switching apparatus 12 interfaces are defined in detail in FIG. 3. The set of lines 31, 32, 33, and 34 at each in-port to the switching apparatus 12 are identical in number and function to the set of lines 41, 42, 43, and 44 at each out-port. The sets of interface lines to each input and output port contain seven unique signals: 4 digital data lines, and 3 digital control lines (VALID, REJECT, and ACCEPT). The signals at each port are differentiated by a prefix of INX- or OUTX- indicating the direction and number of the port (X) that they are associated with. The four digital data and one VALID lines have a signal flow in the direction going from input to output across switching apparatus 12, while the digital REJECT and ACCEPT control lines have a signal flow in the opposite direction.

Each unidirectional switch interface set requires only 7 signals, as shown in FIG. 3, to transmit and control and data through the network 30—the digital data and control transfer width is ½ byte (4 bits) at a time. The signals required are:

DATA: 4 parallel signals used to command switch connections and transmit digital data messages or digital control headers.

VALID: When active, indicates that a digital message, control header, or analog waveform is in the process of being transmitted. When inactive, indicates a RESET command and causes all switches to reset to the IDLE state.

REJECT: Signal flow is in the opposite direction from the DATA and VALID signals. When active, it indicates that a REJECT or error condition has been detected.

ACCEPT: Signal flow is in the same direction as the REJECT signal. When in the low state, it indicates that a message is in the process of being received and checked for accuracy. When active, it indicates the message has been received correctly.

Figure 4:
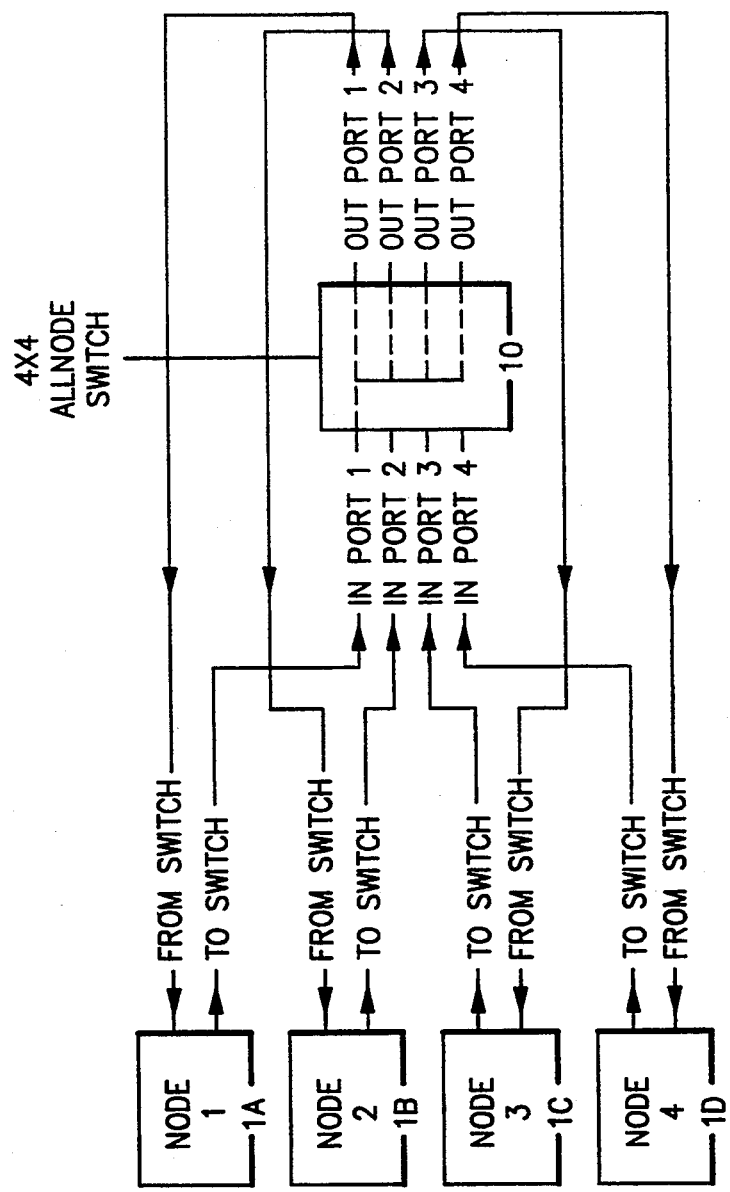
FIG. 4 illustrates the interconnections required to a four input and four output (4×4) crossbar switching apparatus to provide full interconnection amongst four nodes.

As illustrated by FIG. 4 the ALLNODE switching apparatus would be provided for a node having a plurality of input and output ports, and would comprise the connection control circuit for each input port, and a multiplexer control circuit for each output port for connecting any of I inputs to any of Z outputs, where I and Z can assume any unique value greater or equal to two, as in the parent application.

FIG. 4 shows a 4×4 crossbar ALLNODE switching apparatus, where the ALLNODE switching apparatus 10 is unidirectional, which means that data flows in only one direction across the said switching apparatus 10, that being from input to output. Although the said switch apparatus 10 is unidirectional, it supports bidirectional communication amongst four nodes (1A, 1B, 1C, and 1D) by connecting the 4×4 ALL-NODE switching apparatus 10 as shown in FIG. 3. Each node 1A, 1B, 1C, and 1D has two sets of unidirectional interconnecting wires, one going to the switch 10 and one coming from the switch 10. The dashed lines internal to the switching apparatus 10 indicate that the function of the said switching apparatus is to connect an input port such as INPUT PORT 1 to one of four possible output ports. The switching apparatus 10 provides exactly the same function for each input port, allowing it to be connected to any unused output port.

Figure 5:
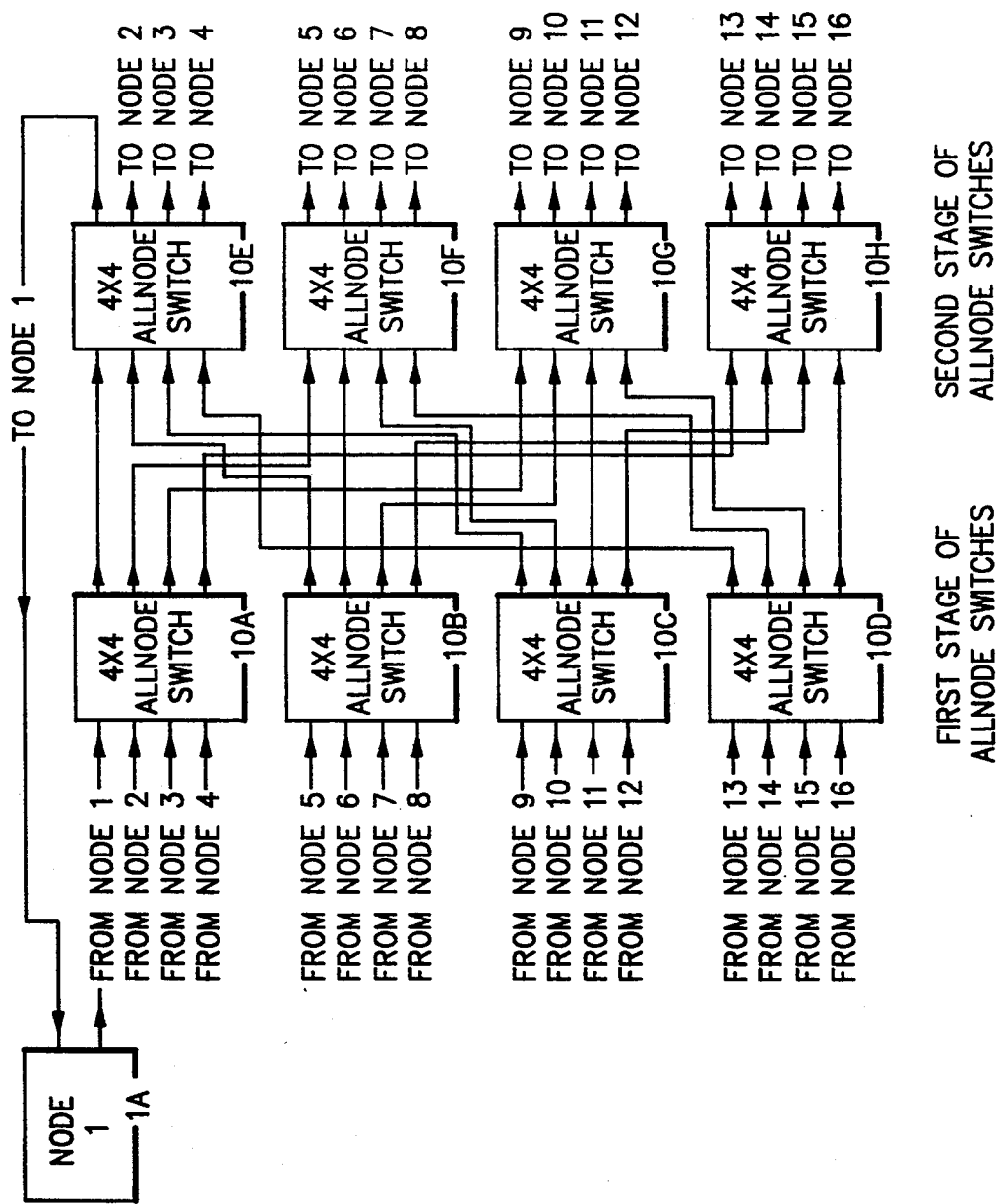
FIG. 5 shows a typical method for cascading the 4×4 asynchronous switching apparatus devices to accomodate parallel systems having more than 4 nodes.

Referring to FIG. 5, a method is illustrated for increasing the number of nodes in a system by cascading eight switching apparatus 10 blocks. The eight cascaded switches are denoted as 10A through 10H to indicate that they are identical copies of switching apparatus 10, varying only in regards to the wiring of their input and output ports. It can be noted that any of sixteen nodes can communicate to any other node over a connection that passes through exactly two of the switching apparatus 10 blocks. For instance, Node 5 can send messages to Node 15 by traversing switch 10B and switch 10H. Since all connections are made through two switching apparatus 10 blocks, the network comprised of the eight switching apparatus 10 blocks is referred to as a two stage switching network. Other multi-stage networks can be configured from switching apparatus 12 blocks by using three stages, four stages, etc. in a similar manner.

Figure 6:
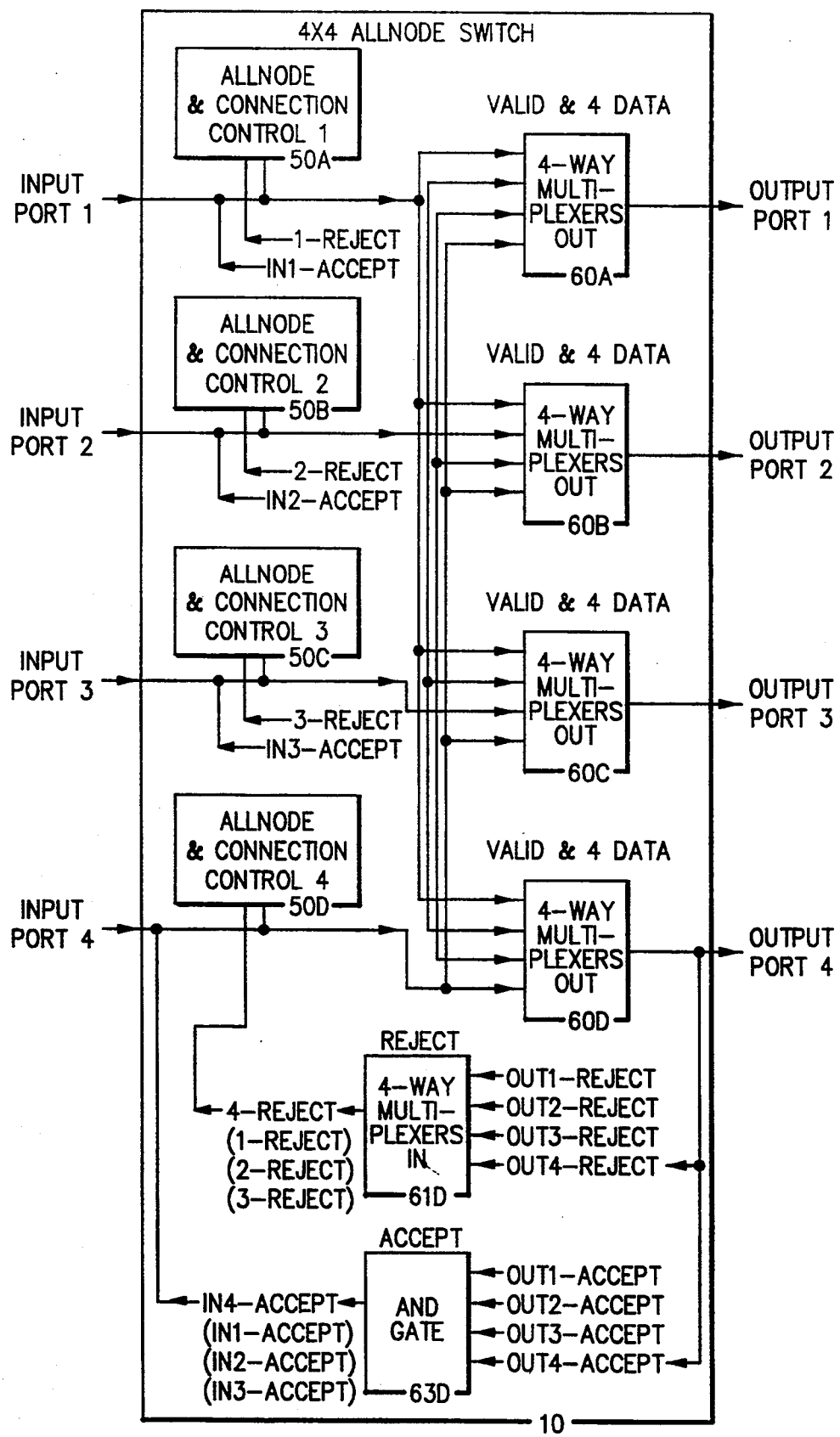
FIG. 6 shows a schematic block diagram of the simple digital data flow and control path implementations of the 4×4 asynchronous switching apparatus, which has the capability of being modified by the present invention to provide fully parallel switching means for interconnecting up to four system nodes for the purpose of transferring digital data.

Referring to FIG. 6, a functional diagram of the simple data flow across ALLNODE switching apparatus 10 is illustrated. The VALID and four data lines at each input port, inside the switch, and at each output port are represented by a single line in FIG. 6 for simplicity. For instance, the VALID and four data lines entering switch 10 at IN PORT 1 go to five internal functional blocks of switching apparatus 10; these are blocks 50A, 60A, 60B, 60C, and 60D. Block 50A makes the decision as to which of the four possible output ports are to be connected to input port 1. The VALID and four data lines from each input port go to each output multiplexer block (60A, 60B, 60C, and 60D); this makes it possible to connect any input port to any output port. Each of the four output multiplexer blocks (60A, 60B, 60C, and 60D) is uniquely commanded from each of the control blocks (50A, 50B, 50C, and 50D) as to which of the four possible sets of input port lines is to be gated through to each output port. For instance, control block 50A can command multiplexer 60C to connect input port 1 to output port 3; control block 50B can command multiplexer 60A to connect input port 2 to output port 1; and control block 50C can command multiplexers 60B and 60D to connect input port 3 in a multi-cast fashion to output port 2 and output port 4. All three connections are capable of being established simultaneously or at different times. At the same time that multiplexers 60A to 60D form connections to move the VALID and data signals across switch 12 with a unidirectional signal flow from input port to output port, multiplexer 61D and AND gate 63D form signal connections for the REJECT and ACCEPT signals, respectively, with a signal flow in the opposite direction of output port to input port (typical implementations are shown by blocks 61D and 63D—similar blocks are associated with each input port). These REJECT and ACCEPT signals provide a positive feedback indication to switch 10 of actions taken either by subsequent switch 10 stages in a cascaded network or by the device receiving and interpreting the VALID and four data signals. A control header or digital message being transmitted through switching apparatus 10 over the four data signals under control of the VALID signal can be REJECTed by any network stage if it is unable to establish the commanded connection or by the receiving device if it is not capable of receiving the message at this time or if it detects an error in the transmission. The receiving device also has the capability of confirming the correct arrival of a command or message (without errors being detected) by pulsing the ACCEPT signal. Since the REJECT and ACCEPT signals go in the opposite direction from the data flow, they provide a means of reporting back a positive indication to the sender on whether the attempted transmission was received correctly or rejected.

Figure 7:
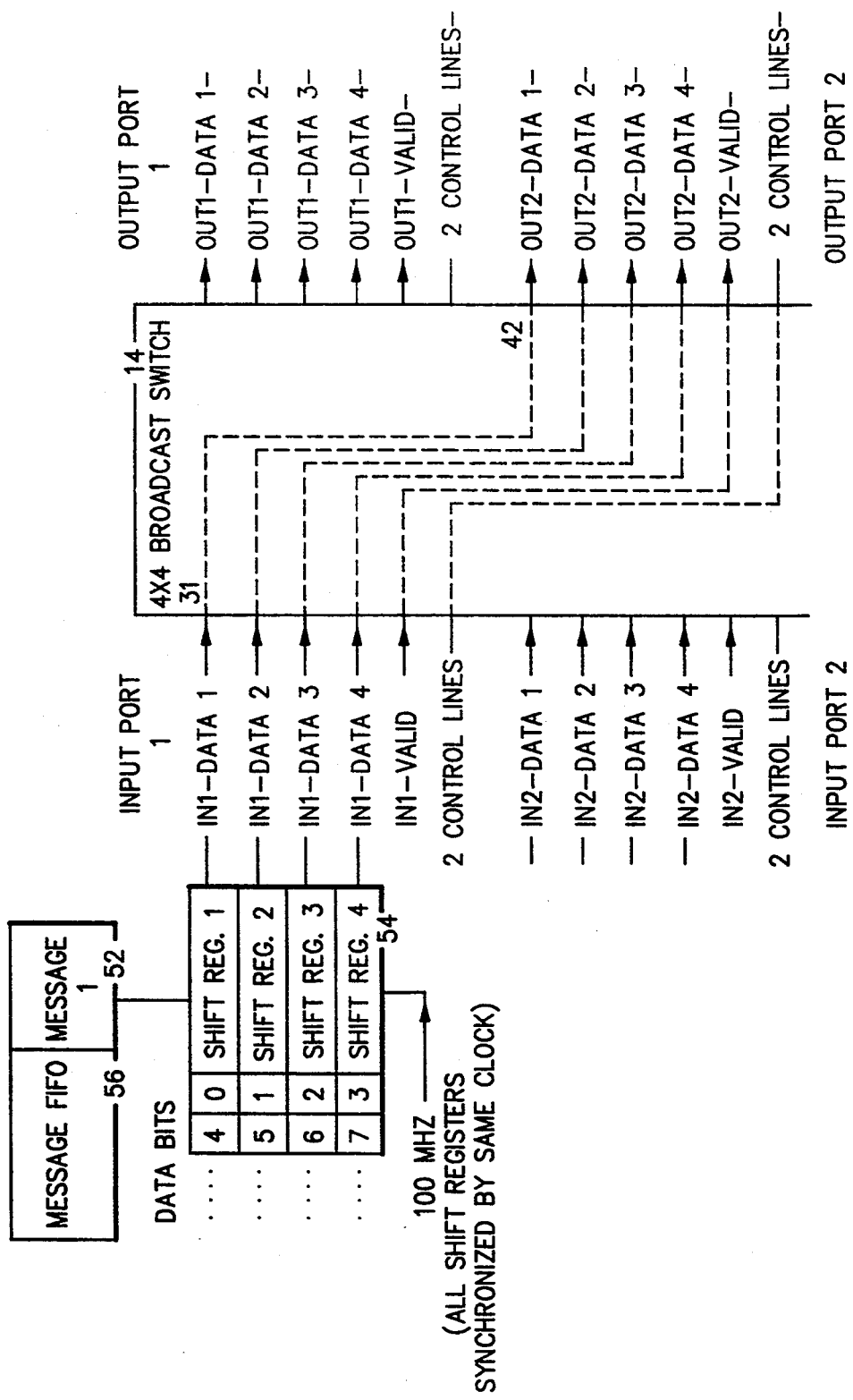
FIG. 7 illustrates a typical method for generating parallel control and and multiple line serial digital data information to be sent to the 4×4 prior parent embodiment of the invention switching apparatus over four synchronous data lines.

Referring to FIG. 7, blocks 56, 52, and 54 illustrate a typical method for generating multi-line (parallel)-/serial digital data in the form of a message which can be transmitted to and across switching apparatus 14, which is a partial drawing of the switching apparatus 12. Similar parallel/serial data generation logic as provided by 56, 52, and 54 can be used at each of the other input ports to switching apparatus 12. Each set of input data lines provides 4 serial data lines to a given input port which is synchronized to the same clock by the four shift registers 54 which create the parallel/serial data by shifting four synchronized lines of data 31 as controlled by the same identical clocking signal (100 MHZ in Fig.6). However, the four different input port sources (31, 32, 33, and 34 of FIG. 3) to switching apparatus 14 can be asynchronous to each other, being based on different, non-synchronized, 100 MHZ clocking signals.

The process for sending parallel/serial messages through switching apparatus 14 involves FIFO 56, which accumulates data messages to be transmitted. The next entire message to be transmitted is moved to buffer 52. The message stored in buffer 52 is moved to shift registers 54 in preparation for transmittal and the data is dispersed across the four shift registers 54 by placing data bit 0 into the first bit of shift register 1, data bit 1 into the first bit of shift register 2, data bit 2 into the first bit of shift register 3, data bit 3 into the first bit of shift register 4, data bit 4 into the second bit of shift register 1, etc. Shift registers 54 then begin to send serial data to switching apparatus 14 over four synchronized data lines, in such a manner that the parallel/serial data flows continuously until the entire message has been transmitted. The switch apparatus 14 uses the first eight bits transmitted (in the first two clock cycles of serial data over interface 31 from serial registers 54 to switching apparatus 14) to select and establish a connection path through the switching apparatus 14. The example in FIG. 7 illustrates via dashed lines, the switching apparatus establishing a temporary connection between input port 1 (31) and output port 2 (42), such that each of the eight individual lines in interface 31 are uniquely and directly connected to each of the corresponding lines in interface 42.

Figure 8:
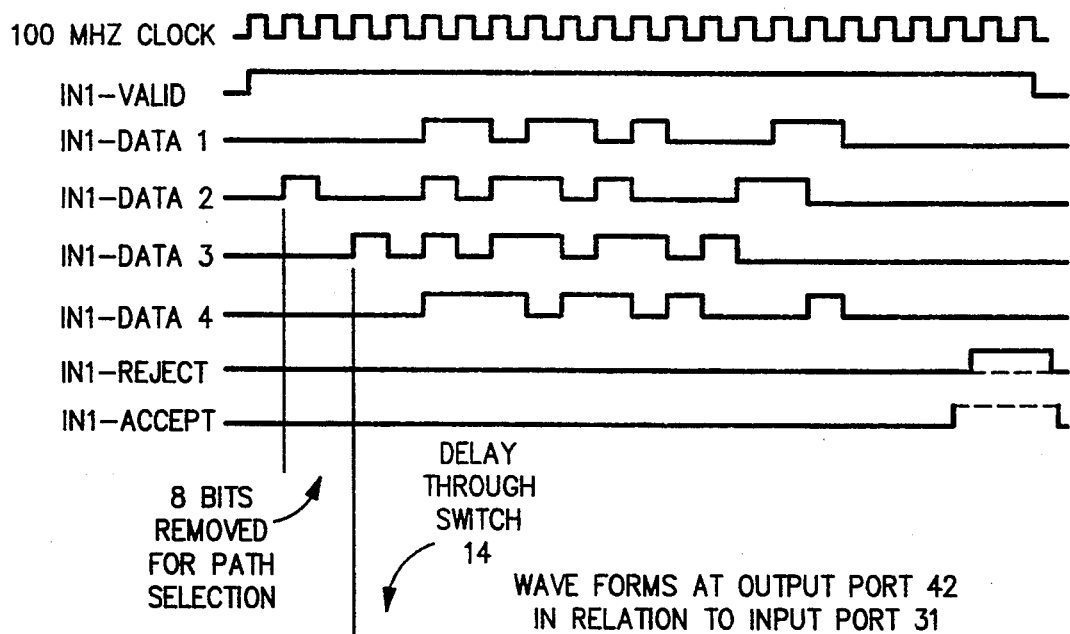
FIG. 8 shows a typical timing diagram for routing the digital interface signals arriving at one input port of the 4×4 prior parent embodiment of the invention switching apparatus to one output port.
Figure 8:
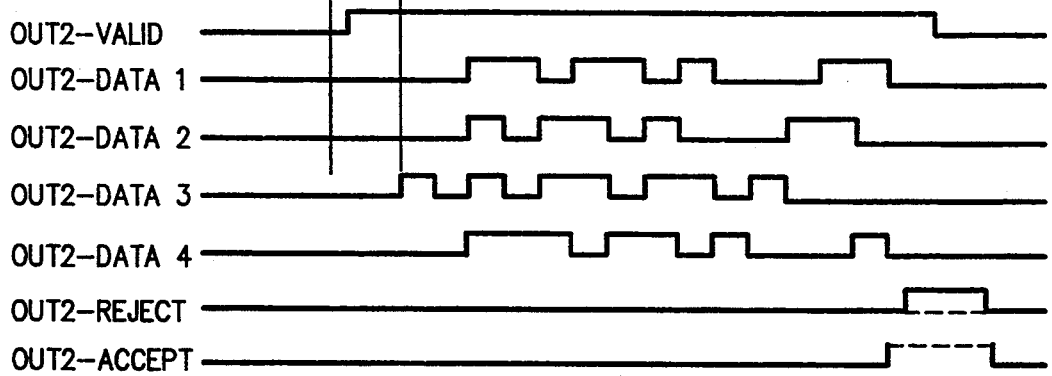

Referring to FIG. 8, typical serial waveforms are shown for both input and output ports of the switching apparatus 14. The switch removes the first 8 bits of the serial transmission as sent by shift registers 54 and uses them to make and hold a connection, such as interface 31 to interface 42. The remainder of the serial message in our example is transferred directly from interface 31 to interface 42, so that interface 42 sees that exact same message that interface 31 receives, minus the first 8 bits and delayed by the circuit delays encountered by the serial data as it traverses the switching apparatus 14. Switching apparatus 14 does not buffer or re-clock the serial data entering via interface 31 in any manner; it merely reflects as quickly as possible the input waveforms it receives over interface 31 to output interface 42 without changing them in any way, except to strip off the first 8 bits.

The convention for indicating to a switch 14 input port over an interface (such as 31) that there is no transfer in progress, is to issue continuous IDLE commands, which are denoted by the 4 data lines and the VALID control line being held at logical 0's. The detection of a logical 1 on any of the input lines will signify the departure from the IDLE state and signify to the switch that a selection and transfer is beginning. Likewise, the output lines from the switch will be held in the IDLE state (at all 0's), when there is no active transfer in progress.

In general, all switches require a path selection method, whereby they are commanded which connection (input port to output port) to establish. For switching apparatus 10, the path selection command is transmitted to the switch over the same interface that the data is transferred; i.e., the 4 data lines associated with each input port. Selection information must be transferred prior to the data, so that the commanded interconnections can be established and the data can then flow to the commanded destination. The selection information need NOT identify an input port number (1 to 4), because it is arriving at the switch over a specific input and the switch already knows what input number it is receiving data on. Therefore, the selection information need ONLY specify the number (1 to 4) of which one of the four output ports of switching apparatus 10 to which to connect. The method of path selection recommended here is one out of N encoding with a return to zero (called a DEAD FIELD).

Figure 9:
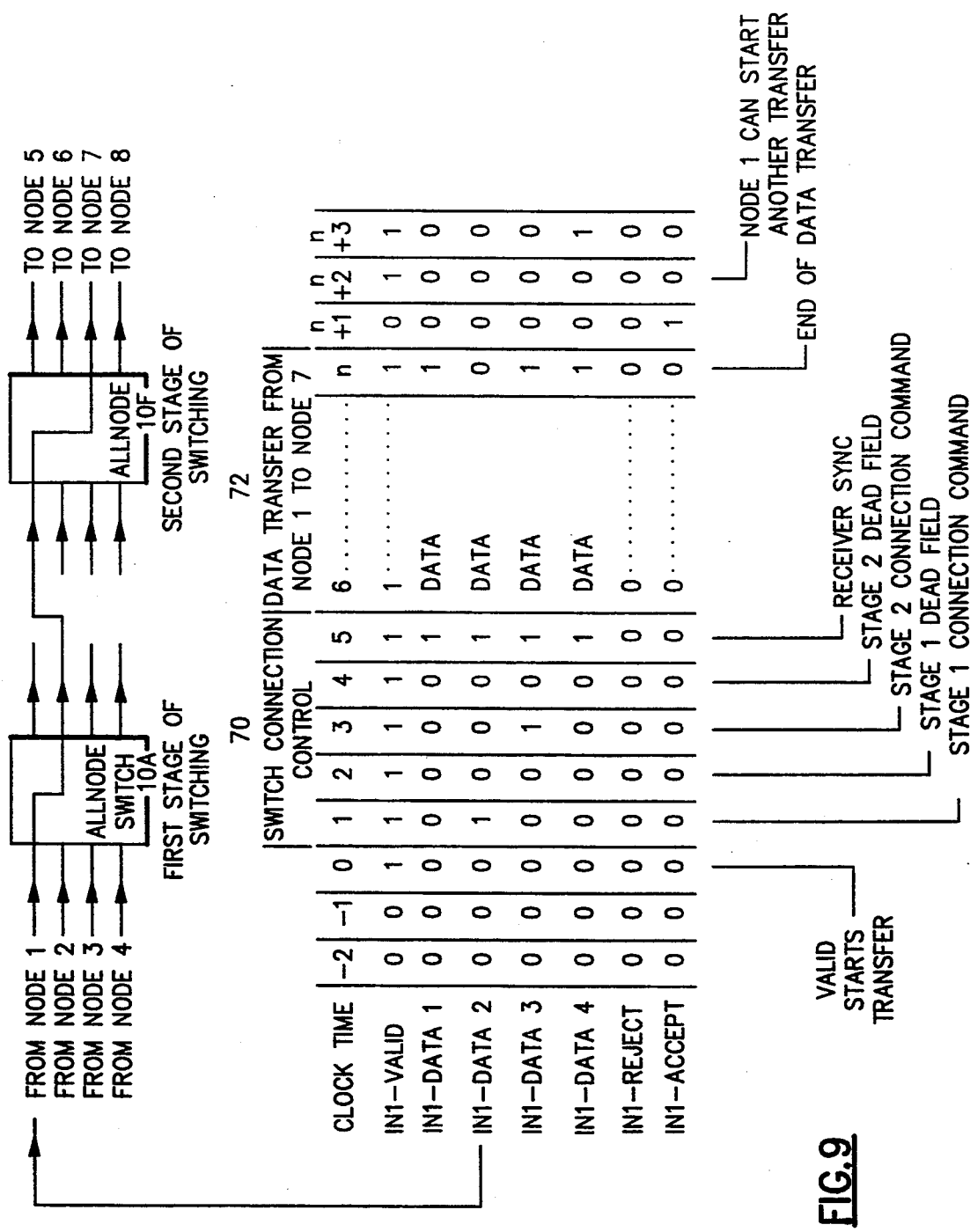
FIG. 9 illustrates the typical method of selecting and establishing a transmission path through a network comprised of the invention switching apparatus for the purpose of sending digital data from one node to another.

Referring to FIG. 9, a typical example of the exact serial bit patterns and control signal activation is shown for sending control and digital data information to switching apparatus 10. The example references the cascaded, two stage switching network shown in FIG. 5 and involves sending data across the network from node 1 through switching apparatus 10A and 10F to node 7. To make this connection, input port 1 must be connected to output port 2 of the first stage switching apparatus 10A, and input port 1 must be connected to output port 3 of the second stage switching apparatus 10F. The signal sequence that is sent to input port 1 to cause the desired connections in switching apparatus 10A and 10F is shown in FIG. 5. In the signal sequence of 1's and 0's, time advances from left to right, so that the values seen at clock time −2 arrive at switch 10A first, and the values at clock time −1 arrive second, etc. The values of the IN1-DATA and IN1-VALID lines are all zeroes and cause nothing to happen at switch 10A during times −2 and −1, because they indicate IDLE. At clock time 0, the IN1-VALID line goes to a logical 1. This prepares switch 10A by enabling the input port 1 to receive data, but no connection or action takes place at switch 10A at this time. The IN1-VALID control line basically enables the corresponding switch input port; when IN1-VALID is a logical 0, switch 10A cannot make any connections or receive any data from input port 1, which is held RESET. Finally, at clock time 1, switch 10A receives its command as to what output port to connect to; the command is received entirely during clock time 1.

The command bit pattern sent at clock time 1 is used by switch 10A to establish connection to an output port; this process is referred to as a path selection operation and takes place completely internal to switch 10A. The path selection approach implemented by the present ALL-NODE switch invention is to let each of the 4 IN1-DATA lines to define a unique output of switch 10A to be selected. For instance, IN1-DATA1 signal going to a logical 1 at time 1 tells switch 10A to connect to output port 1, IN1-DATA2 commands connection to output port 2, etc. In our example, since IN1-DATA2 goes to a logical 1 during clock time 1, switch 10A is thereby commanded to connect to output port 2. In other words, the connection algorithm is that the first data input line going to a logical 1 after an input port has been enabled, defines the connection which that input port is to make. This is a mutually exclusive process, in that for the normal case only one data line at clock time 1 is allowed to be a logical 1; the other 3 data lines must be 0's. Note that since 1 bit of selection information is guaranteed to be a logical 1, switch 10A will be able to recognize the start of a transmission without requiring any additional bits to signify that a transfer is commencing. The switch 10A makes the commanded connection by removing the 4 bits from the data lines and storing them in a selection register in control block 50A of FIG. 8. The bits transmitted during clock time 1 are not passed through switch 10A to switch 10F, but instead switch 10A begins passing the very next 4 bits of data corresponding to clock time 2 to the next switch 10F. However, the information bits following a selection command (those transmitted by the 4 data lines at clock time 2 in our example) must always be all zeroes (a DEAD FIELD) as shown in FIG. 8. The purpose of this will be explained subsequently.

At clock time 2, the connection of switch 10A input port 1 to output port 2 is established and causes the signal sequence at clock time 2 to be transmitted across switch 10A and the interconnecting wires to switch 10F input port 1. From this time on, switch 10A merely transmits all subsequent data immediately to switch 10F input port 1; it never examines or takes any action on any other data patterns presented to switch 10A over its input port 1 interface. It just passes all data patterns it receives over input port 1 immediately to the output port 2 and switch 10F. Thus, at clock time 2, assuming zero delay across switch 10A and its associated cable, switch 10F input port 1 sees the VALID signal rise and the all zeroes DEAD FIELD on the 4 data lines coming into switch 10F input port 1. In this way, at time 2, switch 10F input port 1 is enabled in an identical manner to the way switch 10A input port 1 was enabled previously at time 0.

In our example, IN1-DATA3 goes to a logical 1 during clock time 3 and switch 10F is thereby commanded to connect its input port 1 to its output port 3, in a manner similar to the way switch 10A was commanded to connect its input port 1 to its output 2 during clock time 1. The switch 10F in making the commanded connection, removes the 4 bits at clock time 3 from the data lines, and stores them in the selection register which is part of control block 50A of FIG. 5. The bits transmitted during clock time 3 are not passed through switch 10F to Node 7, but instead switch 10F begins passing the very next 4 bits of data corresponding to clock time 4 to Node 7. However, the information bits following a selection command (those transmitted by the 4 data lines at clock time 4 in our example) must always be all zeroes (a DEAD FIELD) as shown in FIG. 8. Thus, by clock time 4, switches 10A and 10F have established a connection path for transferring data directly from Node 1 to Node 7. Up to clock time 5, Node 7 sees nothing but IDLE commands. At time 4, Node 7 sees the OUT3-VALID line from switch 10F go active and is thereby enabled to start receiving data at time 5. From time 5 on, Node 7 can receive data from Node 1 over the 4OUT3-DATA lines from switch 10F. The protocol of the actual data being transmitted can be any of the normal formats such as manchester encoded, 8/10 bit encoding with preamble, etc. However, the preferred embodient, as shown in FIG. 8 is an all ones synchronization field at time 5, followed by the NRZ data message. The data message can specify the word count length of the transfer. The purpose of the synchronization field of all ones as a prefix to the actual data message, is to enable the receiving node 7 to synchronize to the sending node 1 in one clock time. This assumes that the two nodes involved in the data transfer have clocking systems that are asynchronous to each other, but are operating at the same frequency within a specified tolerance.

The preferred embodiment is to transmit the word count length of the message first during clock time 6 and clock time 7. Node 7 then decrements the length count and can detect when the transfer is complete. Node 7 can then check the message for accuracy using the selected error detection method (parity, ECC, or CRC). If the message has been received correctly, Node 7 responds by activating the ACCEPT interface line back to switch 10F at clock times n+1 and n+2. Switch 10F passes the ACCEPT indication back to switch 10A, which in turn returns it immediately to Node 1. This indicates to Node 1 that the transfer completed successfully, and Node 1 resets its VALID and 4 data lines to switch 10A to zeroes, thus, completing the data transfer and returning to the IDLE state. The IN1-VALID input line to switch 10A going to a zero at time n+3, causes switch 10A input port 1 to break its connection to output port 2 and to return to the IDLE state. Immediately, switch 10F sees its IN1-VALID input line go to a zero, breaks its connection to output port 3 and returns to the IDLE state. Thus, the connections can be broken and the switches returned to IDLE in as little as one clock time. If Node 1 has another message to transmit, it can load the next message into buffer 52 and shift registers 54 (FIG. 7), and begin transmission to Node 7 or any other node as soon as time n+4. The only restriction is that the VALID signal generated by Node 1 must return to zero for a minimum of one clock time (time n+3) to signify the end of one transfer before beginning another.

If Node 7 finds an error in the message it has received after the word count has gone to zero at clock time n, it responds by activating the REJECT interface line (instead of ACCEPT) back to switch 10F. Switch 10F uses the incoming REJECT signal from Node 7 to break its connection to Node 7, to return to the IDLE state, and to pass the REJECT indication back to switch 10A, which in turn returns it immediately to Node 1 after breaking its connections and returning to IDLE. Node 1 then notes that the transfer has been rejected, and returns to the IDLE state by resetting its VALID and 4 data lines to switch 10A to zeroes. Node 1 may then retry the transmission by reloading shift registers 54 from buffer 52 and starting the transmission over again from the very beginning (clock time −1). The retransmission can occur over the identical path as the previously rejected transmission, or if alternate paths through the network are implemented another path can be tried. If continuous REJECTs are encountered, such that a specified number of REJECTs occur for the same message, an error reporting mechanism may be invoked.

It is also possible for any switch 10 in a network path to REJECT a message. This can occur for either of two cases:

1) BUSY—If the output port to which the switch is commanded to connect is BUSY (i.e., it is being used by a previously established connection), the switch will signify this condition to the input port issuing the command by activating the REJECT line back to the previous network stage or to the transmitter (if the first stage of the network detects BUSY). For instance, in the example shown in FIG. 8, if 10A had received a command at clock time −2 to connect input port 4 to output port 2, that connection would have been active when input port 1 requested to be connected to output port 2 at clock time 1. In this case, output port 2 is BUSY at clock time 1 and switch 10A would activate the IN1-REJECT line to Node 1. As described above, the transmitter may retry any REJECTed message.

Likewise, the connection could be made successfully at switch 10A, yet output port 3 of switch 10F could be BUSY at clock time 3, causing switch 10F to issue the REJECT signal to switch 10A. This, in turn, causes switch 10A to return REJECT immediately to Node 1 after breaking its connections and returning to IDLE.

2) Simultaneous CONTENTION—Rather than input port 4 establishing a connection to output port 2 in switch 10A at clock time −2 as described above (in advance of the same command from input port 1 at clock time 1), it is possible for two or more input ports to try to connect to the same output port at approximately the same time. This is called CONTENTION for an available output port. For instance, suppose input ports 1 and 4 both sent simultaneous-commands at clock time 1 requesting to be connected to output port 2. The present invention resolves this contention by first connecting both contending input ports 1 and 4 to output port 2. The net effect is to electrically connect the 2 input ports to output port 2, which will logically OR the signals coming from both sources. During clock time 2 the logical OR of the 2 input ports will NOT cause an error, because the values present on both input ports 1 and 4 are identical: the VALID lines for each are logical 1's and the data lines for each contain the DEAD FIELD (logical 0's). However, at clock time 3, the signals from each source could be different and an error could be caused if the 2 input ports both remained connected at clock time 3 and later. In other words, switch 10A has 1 cycle time (clock time 2) to correct the decision it made to connect two or more inputs to the same output. Switch 10A makes this correction during clock time 2 by detecting the fact that more than one input is connected to a given output. It then takes action by resetting all but one of the multiple connections, and does this before clock time 3 occurs. The decision of which connection(s) to reset and which one to keep is a decision based on priority. For the preferred embodiment, a simple priority scheme is used as follows: If input port 1 is contending it gets the connection, If input port 1 is not contending and input port 2 is, input port 2 gets the connection. If input ports 1 and 2 are not contending and input port 3 is, input port 3 gets the connection. Input port 4 gets the connection only if no other input port wants it. Applying the priority selection to our example, input port 1 gets to keep its connection to output port 2, while the connection of input port 4 to output port 2 is reset during clock time 2. This results in the REJECT signal being issued in the normal fashion from switch 10A to input port 4.

Thus, the purpose of the DEAD FIELD in the present invention is to allow one clock time per switch stage to resolve simultaneous contention. The secondary purposes of the DEAD FIELD are to cause a falling edge on the selection bit which was active during the previous clock time, and to compensate for timing skew which might be present across the 4 data lines carrying serial selection data to the cascaded switches. Both the rise and fall of data bits commanding the switches to make connections gives the unclocked switch two clock edges (rise and fall) on which it can trigger and make decisions. These are the only two decision making times available to the ALL-NODE switch.

Turning now to the priority interrupt and camp-on features of the present invention, intelligent features at each stage of the network function make and break connections on a priority basis. The modified switch can make any of the three intelligent decisions as follows:

1. If a connection is requested at a switch stage and the connection is not being used and is not being requested by a higher priority device, the requested connection is established.

2. If a connection is requested at a switch stage and the connection is being used or requested by a higher priority device, the requested connection is not established. Instead, the camp-on function is invoked which keeps the unsuccessful connection pending until the higher priority user relinquishes the facility. Then immediately, another pending connection (the highest priority pending connection) is made.

3. If a connection is requested at a switch stage and the connection is being used by a lower priority device, the low priority connection is interrupted (broken) and the requested higher priority connection is established.

This disclosure covers either of two options that can occur in regards to the broken lower priority connection.

1. The broken lower priority connection can be rejected all the way back through the network to the sender, and the sender forced to retry the message from the beginning at a later time. In this case any partial message received by the receiving would be erased from its buffer.

2. The broken lower priority connection can be temporarily paused all the way back through the network to the sender, and the sender forced to temporarily pause the message. After being paused, the lower priority connection can be broken. The broken lower priority connection then invokes the camp-on function at the point where the connection was broken and remains pending until the higher priority user relinquishes the facility. Then immediately, another pending connection (the highest priority pending connection) is made. When the connection is reestablished, the paused sender is informed and the temporarily paused message continues.

The second of these methods can be very dangerous to use, because it can result in the inter-mixing of partial messages with complete messages at the receiving nodes. For example, consider the case where a higher priority message interrupts a lower priority message and both are going to the same destination node. If the receiving destination node has only one receiving FIFO, the order that the messages will go in the receive FIFO is as follows: 1) part of the low priority message, 2) the complete high priority message, and 3) the rest of the low priority message. Therefore, the messages can get scrambled in the receive FIFO and some, possibly sophisicated method would have to be used to unscramble them or an error would occur. The receiving processor would read what it would think was a low priority message, and instead it would receive garbage—something that was part low priority message and part high priority header and message. Because of the problems involved with method 2), method 1) presented here as the preferred embodiment and method 2) is considered an alternate embodiment.

A typical example of how the Camp-on and Priority Interrupt Switch works is given in regards to a modification of the 4×4 ALLNODE switch 10m layout as shown in FIG. 1. The function of the present disclosure is to provide a means of connecting any of four input ports on a mutually exclusive and interruptible basis to any one of four output ports on a priority basis. The definition of the new Camp-on interface signal is as follows:

CAMP-ON: When active, indicates the message in process is in the "Camp-on and Priority Interrupt" mode. When inactive, it indicates that the message in process is in normal mode and that previously made connections will not be broken.

Also the definitons of the Reject and Accept interface lines are modified as follows:

REJECT: Signal flow is in the opposite direction from the other 6 signals. When active for a normal mode transfer, it indicates that a REJECT condition has been detected. For a CAMP-ON mode operation, it means that the message as been interrupted by a higher priority message.

ACCEPT: Signal flow is in the same direction as the REJECT signal and opposite to that of the other 6 signals. When in the low state, it indicates that a pending condition has been detected and a high priority connection cannot be made at this time. When in the high state, it indicates that the pending condition has ended and the commanded high priority connection has been established.

Under the present invention, the Allnode switch can operate in the normal mode as disclosed in U.S. Ser. No. 07/677,543, or in camp-on mode which also performs the disclosed priority interrupt functions. Operating in the normal mode, the switch will be capable of receiving commands from each input port, commands that can arrive asynchronously and request connection to a specific output port. If the requested output port is available (NOT BUSY; i.e., not being used to support a previously commanded connection), the command shall be executed and the connection established. If the output port is BUSY, the command shall be rejected and the input port will return to the IDLE state (i.e., ready to accept any subsequent command it receives). This rejected connection in the normal mode is referred to as a KILL or DROP operation because the entire path in the network is broken down or KILLED subsequent to a rejection at any stage of the network.

Switches can "be cascaded together to form networks larger than the 4×4 interconnection scheme supported by an individual switch. FIG. 5 shows how this is done by connecting an output port from one switch to the input port of a second switch. A possible occurrence in this larger network is that the initial switches establish valid connections and a subsequent switch is BUSY and thus issues a REJECT. The REJECT indication then gets sent in the reverse direction back to the previous switch's output port—which has already established a valid connection. In this case, the switch shall dissolve its valid connection and indicate this action by sending a REJECT signal to the input port to which it was previously connected. In turn, the input port will issue a REJECT to its source and then return to the IDLE state. This approach is called KILL, because a REJECT sequence causes all previously established connections to be broken or KILLed and everything in the KILL path to be returned to the idle state. Also, any portion of the message whose transmission has been initiated is completely lost or KILLed and any retransmission of the message must be reinitiated from the very beginning.

Also in the normal mode, if 2 or more of the input ports receive commands simultaneously and contend with each other to establish connection to the same NOT BUSY output port, the lower numbered input port shall win the contention, make the connection desired, and the other contenders shall be rejected and their connections KILLED. Accordingly, it will be seen that the low-priority path through the simplex network uses the KILL function. If rejection occurs in any part of the path, the entire path is broken down immediately and the message must be retransmitted from scratch.

Initially a message transmitted in the CAMP-ON mode has the same reaction at the switch as a message transmitted in the normal mode. If the output port requested is NOT BUSY—a valid connection is established on a first-come, first-serve basis. The new CAMP-ON mode performs additional functions, one of which is to set a special CAMP-ON pending latch to hold an unsuccessful connection pending at the switch until the blocked connection becomes available. Then, it immediately makes the pending connection and issues a positive feedback to the requester. The pending connection cannot be lost unless it is terminated by the message source by dropping the CAMP-ON and VALID interface lines.

In the CAMP-ON mode, each individual Camp-on switch comprising a network issues an ACCEPT signal when the pending connection is made as a postive indication of a successful connection. Until the sending node senses an ACCEPT response to the commanded connection, it temporarily pauses its message transmission and continues from where it left off when the ACCEPT condition is sensed. In addition, the sending node places the priority of the pending camp-on connection on the data lines immediately following the switch selection data. In this way the sending node can individually define the priority of each and every data message. Note that the priority data being placed on the 4 data lines in parallel defines up to 16 priority levels available in the network. The number of priority levels is a function of the number of data lines per switch port, and is not restricted in any other way by this dicsclosure. For example, a network supporting 8 data lines per switch port would define up to 256 priority levels available in the network. The selection and priority data are separated by an all zeroes field on the data lines called a DEAD FIELD. FIG. 10 shows this normal sequence of switch selection data, DEAD FIELD, and priority data for establishing connections at every switch stage of the network. Thus, in the camp-on mode, the sending node doesn't retransmit a blocked message from the beginning, like it does in the normal mode, but instead just pauses and waits until ACCEPT rises. The timimg is such that the sending node receives the ACCEPT indication to continue at the earliest possible moment, thus allowing the camp-on message to be transmitted at the earliest possible time. In addition, all stages previous to the blockage (in which connections were previously won) are held active for the duration of the pause period and never have to be re-established again for the camp-on message in progress. CAMP-ON Mode provides for the guaranteed delivery of a high priority message through a network at the quickest possible time.

If more than one Camp-on message is waiting for the same output port at the same switch to become available, or the desired output port is previously busy with another connection, the CAMP-ON mode feature becomes active as follows:

If the pending connection at the switch stage is being used or requested by a higher priority device, the requested connection is not established. Instead, the camp-on function is invoked which keeps unsuccessful connections pending until the higher priority user relinquishes the facility. Then immediately, another pending connection (the highest priority pending connection)is made.

If the pending connection is being blocked at the switch stage by a lower priority device in CAMP-ON mode or any device in normal mode, the lower priority or normal mode connection is interrupted (broken) and the requested higher priority connection is established.

The breaking of a connection is performed in an ordered manner as follows:

The priority of every CAMP-ON connection when it is successfully established has its associated priority 83 (as transmitted after the DEAD FIELD as shown in FIG. 5) stored at the individual switch stages. A normal mode connection has all zeroes stored indicating that it is of lowest priority.

Any arriving CAMP-ON mode connection requesting a previously busy output port, invokes the CAMP-ON priority function of the switch. This function compares the incoming priority value 83 of the blocked connection (as transmitted after the DEAD FIELD as shown in FIG. 5) against the value stored for the present connection. There are 3 possible occurrences as follows:

1. The values compare equal. In this case the established connection prevails and the pending connection remains pending in the CAMP-ON mode until the previous connection is terminated in the standard manner.

2. The pending priority is lower than the established connection priority. In this case the established connection prevails and the pending connection remains pending in the CAMP-ON mode until the previous connection is terminated in the standard manner.

3. The pending priority is higher than the established connection priority. In this case the established connection is interrupted and the pending connection is subsequently made using the following steps.

a. The CAMP-ON logic forces both the VALID and CAMP-ON lines to the output port supporting the existing connection to zeroes, while forcing the data lines to logical ones. This predefined sequence to the receiving node informs it to cancel the message and any pad of the message that it has already received.

b. The CAMP-ON logic forces the REJECT line to the sending node to go active, informing it that the message in progress has been rejected.

c. The CAMP-ON logic breaks the previously established connection to free the output port having the pending higher priority connection.

d. The CAMP-ON logic examines all of the pending requests by implementing a queue of the pending requests.

e. The CAMP-ON logic selects the highest priority from the pending queue (from amongst the pending requests) and makes a decision to make that connection next. If two or more priorities in the pending queue are equal in priority, the CAMP-ON logic selects one of the highest priority requests to be serviced next, and invokes a round robin servicing function that prevents the servicing of the same requestor with the same priority from occurring twice until after the other requests to that output port of the same priority have been serviced once.

f. The CAMP-ON logic establishes the new highest priority connection by making the commanded connection and responding with a positive ACCEPT signal to the input port requesting the connection. This ACCEPT response is reflected through the network to the sending node, which terminates the pause in the message sending operation and proceeds with the transmittal of the remainder of the message.

The result of this implementation is that a high priority path is established at the quickest possible speed because the high priority command is stored at the switch stage involved and made on a priority basis as soon as output port required becomes available, or whenever it is the highest priority pending connection. In addition, a positive feedback is given to the sending node establishing the connection immediately upon the making of the connection, so that it may proceed at the earliest possible moment.

The broken path is re-established differently based on whether it was a camp-on transfer or normal transfer. If a normal transfer, the originator of the connection blindly (not knowing if it can get the connection it got bumped from or not yet) tries to re-establish the total connection again starting from the beginning. For camp-on transfer, the forward and backward paths are also totally cancelled by dropping VALID. However, the sending node can immediately re-establish the path up to the break point, and then camp-on that connection until it becomes available. It can then remake the connection as soon as possible, and continue to re-establish the rest of the path.

Clearly, the inventions which we have described by way of example and in illustration of our best mode of practicing the inventions in the various embodiments described provide a basis for much potential growth. Accordingly, it will be understood that those skilled in the art, both now and in the future, will envision further improvements even by way of invention, and these should be understood to be within the claimed scope which should be construed to protect and preserve the rights of the inventors.

What is claimed is:

1. A multi-stage bufferless switching network, the network comprising:

a plurality of bufferless switching apparatuses cascaded into stages, each said switching apparatus including a plurality of switch inputs and a plurality of switch outputs, each of the switch outputs of each said switching apparatus coupled to a different switch input of others of said switching apparatuses, switch outputs of last stage switching apparatuses comprising network output ports and switch inputs of first stage switching apparatuses comprising network input ports; and a plurality of nodes each coupled to one of the network output ports and to one of the network input ports, each node comprising means for receiving a data message and means for sending a data message including a connection request, the means for sending a data message and the means for receiving a data message including a computer system device, the means for sending a data message including means for selectively assigning a priority level to the data message; said switching apparatuses each including:

connection means for establishing a communication path between any one of the network input ports and any one of the network output ports in response to said connection request received at said any one of the network input ports, said communication path for transmitting a data message received at said any one of the network input ports to said any one of the network output ports, said connection means including asynchronous connection means for establishing asynchronously a plurality of simultaneously active communication paths between a plurality of network input ports and a plurality of network output ports in response to a plurality of connection requests received separately or simultaneously at said plurality of network input ports, said simultaneously active communication paths for transmitting a plurality of data messages received separately or simultaneously at said plurality of network input ports to said plurality of network output ports; and priority connection means for detecting a priority level assigned to any data message received at any of the network input ports, for terminating a communication path established for a lower priority level data message or a non-prioritized data message if said communication path established for a lower priority level data message or a non-prioritized data message blocks a same switch output as requested by a node having a higher priority level data message, and for enabling the connection means to establish a communication path through the requested switch output for the higher priority level data message.

2. The switching network of claim 1, wherein said switch inputs and switch outputs comprise a plurality of data lines for sending in parallel said data message received at said any one of the network input ports to said any one of the network output ports.

3. The switching network of claim 2, wherein said switch input ports and switch output ports further comprise a plurality of control lines, said plurality of control lines including a first control line for signalling back to a sending node a rejection of a data message sent to a receiving node, and a second control line for signalling back to the sending node an acceptance of said data message sent to the receiving node.

4. The switching network of claim 3, wherein said plurality of control lines further includes a third control line for enabling the connection means to establish communication paths and for enabling the priority connection means to terminate an established communication path.

5. The switching network of claim 4, wherein said plurality of control lines further includes a fourth control line for signalling that established communication paths are for a prioritized data message.

6. The switching network of claim 4, wherein said priority connection means detects $2^p$ different data priority levels, where p is the number of said plurality of data lines.

7. The switching network of claim 2, wherein said priority connection means includes camp-on means for holding in a pending mode any path connections established for a prioritized data message up to a blocked switch output if the blocked switch output is being used for an equal or higher priority level data message, for connecting a path connection held in said pending mode for a highest priority data message to the blocked switch output when the blocked switch output becomes unblocked, and for maintaining remaining path connections in said pending mode until transmission of the highest priority data message through the unblocked output port is complete, the camp-on means operating until there are no path connections in the pending mode.

8. The switching network of claim 7, wherein said camp-on means includes round robin means for connecting in a round robin order several path connections held in said pending mode for several highest priority data messages of an equal priority level to the blocked switch output when the blocked switch output becomes unblocked.

9. The switching network of claim 7, wherein said priority connection means includes partial termination means for terminating a portion of a communication path established for a lower priority level data message or a non-prioritized data message if said communication path established for a lower priority level data message or a non-prioritized data message blocks a same switch output as requested by a node having a higher priority level data message, and for activating the camp-on means for said communication path established for a lower priority level data message or a non-prioritized data message wherein said same switch output as requested by the node having a higher priority level data message becomes the blocked switch output, said portion of a communication path including only a network stage immediately preceding the same switch output as requested by the node having a higher priority level data message.

10. The switching network of claim 3, wherein for a prioritized data message said first control line is for signalling back to a sending node a termination of a communication path established for the prioritized data message.

11. The switching network of claim 3, wherein for a prioritized data message said second control line is for signalling back to a sending node that the prioritized data message is being held in a pending mode or that the prioritized data message has been accepted.

12. The switching network of claim 1, wherein said priority connection means includes means for signalling to a receiving node to cancel a data message whose communication path was terminated by the priority connection means during transmission.

13. A bufferless switching network comprising:

a bufferless switching apparatus comprising a plurality of switch inputs and a plurality of switch outputs;

a plurality of nodes each coupled to one of the switch outputs and to one of the switch inputs, each node comprising means for receiving a data message from a coupled switch output and means for sending a data message to a coupled switch input, including a connection request, the means for sending data messages and the means for receiving data messages including a computer system device;

said bufferless switching apparatus including connection means for establishing a communication path between any one of the switch inputs and any one of the switch outputs in response to said connection request received at said any one of the switch inputs, said communication path for transmitting a data message received at said any one of the switch inputs to said any one of the switch outputs;

said connection means including asynchronous connection means for establishing asynchronously a plurality of simultaneously active communication paths between a plurality of switch inputs and a plurality of switch outputs in response to a plurality of connection requests received separately or simultaneously at said plurality of switch inputs, said simultaneously active communication paths for sending a plurality of data messages received separately or simultaneously at said plurality of switch inputs to said plurality of switch outputs; and priority connection means for detecting a priority level of any data messages received at any of the switch inputs, for terminating an established communication path transmitting a lower priority level data message or a non-prioritized data message if said lower priority level data message or non-prioritized data message is being sent over a same switch output as requested by a connection request sent by a node having a higher priority level data message, and for enabling the connection means to establish a communication path for the higher priority level data message.

14. A bufferless switching apparatus comprising:
a plurality of switch inputs and a plurality of switch outputs;
connection means for establishing a communication path between any one of the switch inputs and any one of the switch outputs in response to a connection request received at said any one of the switch inputs, said communication path for transmitting a data message received at said any one of the switch inputs to said any one of the switch outputs;
said connection means including asynchronous connection means for establishing asynchronously a plurality of simultaneously active communication paths between a plurality of switch inputs and a plurality of switch outputs in response to a plurality of connection requests received separately or simultaneously at said plurality of switch inputs, said simultaneously active communication paths for transmitting a plurality of data messages received separately or simultaneously at said plurality of switch inputs to said plurality of switch outputs; and
priority connection means for detecting a data priority level of any data messages received at any of the switch inputs, for terminating an established communication path transmitting a lower priority level data message or a non-prioritized data message if said lower priority level data message or said non-prioritized data message is being transmitted to a same switch output as requested by a data message having a higher priority level received at any other of the switch inputs, and for enabling the connection means to establish a communication path for the higher priority level data message.

* * * * *